(12) United States Patent  
Kitazume et al.

(10) Patent No.: US 10,919,567 B2  
(45) Date of Patent: Feb. 16, 2021

(54) ELECTRIC POWER STEERING APPARATUS

(71) Applicant: NSK LTD., Tokyo (JP)

(72) Inventors: Tetsuya Kitazume, Maebashi (JP); Satoshi Shimokawabe, Maebashi (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 16/094,669

(22) PCT Filed: Oct. 24, 2017

(86) PCT No.: PCT/JP2017/038348  
§ 371 (c)(1),  
(2) Date: Oct. 18, 2018

(87) PCT Pub. No.: WO2019/082271  
PCT Pub. Date: May 2, 2019

(65) Prior Publication Data  
US 2020/0298904 A1  Sep. 24, 2020

(51) Int. Cl.  
*B62D 5/04* (2006.01)  
*B62D 6/10* (2006.01)

(52) U.S. Cl.  
CPC ......... *B62D 5/0463* (2013.01); *B62D 5/0466* (2013.01); *B62D 5/0409* (2013.01); *B62D 5/0472* (2013.01); *B62D 6/10* (2013.01)

(58) Field of Classification Search  
CPC .. B62D 5/0463; B62D 5/0466; B62D 5/0409; B62D 5/0472; B62D 6/10; B62D 5/04  
See application file for complete search history.

(56) References Cited

U.S. PATENT DOCUMENTS

2007/0205041 A1* 9/2007 Nishizaki ............. B62D 5/0472  
180/446  
2009/0055049 A1* 2/2009 Sakaguchi ........... B62D 5/0463  
701/41  
2009/0125187 A1* 5/2009 Yamamoto ............ B62D 5/049  
701/42

(Continued)

FOREIGN PATENT DOCUMENTS

EP  3 025 932 A1  6/2016  
EP  3 031 701 A1  6/2016

(Continued)

OTHER PUBLICATIONS

International Preliminary Report on Patentability for PCT/JP2017/038348 dated May 8, 2018 [PCT/IPEA/409].

*Primary Examiner* — Behrang Badii  
(74) *Attorney, Agent, or Firm* — Sughrue Mion, PLLC

(57) ABSTRACT

An electric power steering apparatus that drives a motor based a current command value and assist-controls a steering system by a driving-control of the motor. The apparatus includes a handle-returning control section that calculates a target steering angular velocity by using a steering angle, the vehicle speed, the steering torque and the current command value, calculates a handle-returning control current by using a limit-target steering angular velocity which is obtained by limiting the target steering angular velocity depending on steering angular velocity, and drives the motor by a compensated current command value which is obtained by adding the handle-returning control current to the current command value.

12 Claims, 14 Drawing Sheets

(56) References Cited

U.S. PATENT DOCUMENTS

| | | | |
|---|---|---|---|
| 2009/0200099 A1* | 8/2009 | Wong | B62K 5/05 |
| | | | 180/446 |
| 2009/0266640 A1* | 10/2009 | Oshima | B62D 5/04 |
| | | | 180/444 |
| 2009/0271069 A1* | 10/2009 | Yamamoto | B62D 6/008 |
| | | | 701/41 |
| 2014/0195122 A1* | 7/2014 | Oniwa | G05D 17/02 |
| | | | 701/41 |
| 2017/0073001 A1 | 3/2017 | Oya | |
| 2017/0120948 A1* | 5/2017 | Kitazume | B62D 15/0235 |
| 2017/0137057 A1 | 5/2017 | Kitazume | |
| 2017/0183028 A1 | 6/2017 | Kitazume | |
| 2018/0178832 A1* | 6/2018 | Minaki | H02P 6/16 |
| 2019/0337565 A1* | 11/2019 | Kojima | B62D 15/025 |
| 2019/0359251 A1* | 11/2019 | Shimokawabe | B62D 5/0466 |

FOREIGN PATENT DOCUMENTS

| | | |
|---|---|---|
| EP | 3 141 458 A1 | 3/2017 |
| JP | 4685557 B2 | 5/2011 |
| JP | 5880801 B1 | 3/2016 |
| JP | 5896091 B1 | 3/2016 |
| JP | 2017-052477 A | 3/2017 |
| WO | 2016/017234 A1 | 2/2016 |
| WO | 2016/017235 A1 | 2/2016 |

* cited by examiner

PRIOR ART

ELECTRIC POWER STEERING APPARATUS

CROSS REFERENCE TO RELATED APPLICATIONS

This application is a National Stage of International Application No. PCT/JP2017/038348 filed Oct. 24, 2017.

TECHNICAL FIELD

The present invention relates to an electric power steering apparatus that applies an assist torque to a steering system by pulse-width-modulation-controlling (PWM-controlling) a motor by using an inverter based on a current command value, and in particular to the electric power steering apparatus that improves a function of handle-returning control by calculating a target steering angular velocity based on a virtual vehicle model and correcting the current command value with a handle-returning control current, suppresses an excessive output by limiting the target steering angular velocity in the handle-returning control and reduces uncomfortable feeling of a driver when steering.

BACKGROUND ART

An electric power steering apparatus which provides a steering mechanism of a vehicle with an assist torque by means of a rotational torque of a motor, applies a driving force of the motor as the steering assist torque to a steering shaft or a rack shaft by means of a transmission mechanism such as gears or a belt through a reduction mechanism. In order to accurately generate the assist torque, such a conventional electric power steering apparatus (EPS) performs a feedback control of a motor current. The feedback control adjusts a voltage supplied to the motor so that a difference between a steering assist command value (a current command value) and a detected motor current value becomes small, and the adjustment of the voltage supplied to the motor is generally performed by an adjustment of a duty ratio of a pulse width modulation (PWM)-control.

A general configuration of the conventional electric power steering apparatus will be described with reference to FIG. 1. As shown in FIG. 1, a column shaft (a steering shaft or a handle shaft) 2 connected to a steering wheel (handle) 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Td of the steering wheel 1 and a steering angle sensor 14 for detecting a steering angle θ, and the motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of the steering torque Td detected by the torque sensor 10 and a vehicle speed V detected by a vehicle speed sensor 12, and controls a current supplied to the motor 20 by means of a voltage control command value Vref obtained by performing compensation or the like to the current command value. A steering angle sensor 14 is not indispensable and may not be provided.

A controller area network (CAN) 40 exchanging various information of a vehicle is connected to the control unit 30, and it is possible to receive the vehicle speed V from the CAN 40. Further, it is also possible to connect a non-CAN 41 exchanging a communication, analog/digital signals, a radio wave or the like except with the CAN 40 to the control unit 30.

The control unit 30 mainly comprises a CPU (Central Processing Unit) (including an MCU (Micro Controller Unit), an MPU (Micro Processor Unit) and so on), and general functions performed by programs within the CPU are shown in FIG. 2.

Functions and operations of the control unit 30 will be described with reference to FIG. 2. As shown in FIG. 2, the steering torque Td detected by the torque sensor 10 and the vehicle speed V detected by the vehicle speed sensor 12 (or from the CAN 40) are inputted into a current command value calculating section 31 which calculates the current command value Iref1. The current command value calculating section 31 calculates the current command value Iref1, based on the steering torque Td and the vehicle speed V with reference to an assist map or the like, which is a control target value of a current supplied to the motor 20. The calculated current command value Iref1 is inputted into a current limiting section 33 via an adding section 32A, and the current command value Irefm whose maximum current is limited is inputted into a subtracting section 32B. A deviation I (=Irefm−Im) between the current command value Irefm and a motor current value Im which is fed-back is calculated at the subtracting section 32B, and the deviation I is inputted into a proportional-integral-control (PI-control) section 35 for improving a current characteristic of the steering maneuver. The voltage control command value Vref that the characteristic is improved at the PI-control section 35, is inputted into a PWM-control section 36, and the motor 20 is PWM-driven through an inverter 37 serving as a driving section. The motor current value Im of the motor 20 is detected by a motor current detector 38 and is fed-back to the subtracting section 32B. Field-effect transistors (FETs) are used as a driving device at the inverter 37, and the inverter 37 is constituted by a bridge circuit of the FETs.

A compensation signal CM from a compensation signal generating section 34 is added at the adding section 32A. A characteristic compensation of the steering system is performed by adding the compensation signal CM, and a convergence, an inertia characteristic, and the like are improved. The compensation signal generating section 34 adds a self-aligning torque (SAT) 343 to an inertia 342 at an adding section 344. The added result is further added with a convergence 341 at an adding section 345. The added result at the adding section 345 is treated as the compensation signal CM.

In such an electric power steering apparatus, friction due to the reduction gears and the rack-and-pinion is large, and an equivalent inertia moment around the steering shaft by the motor in order to generate the assist torque is large. Accordingly, in a case that the self-aligning torque (SAT) is small in a low vehicle speed range, the handle-returning is not adequate because of the large friction. Since the steering angle is not returned to a neutral position by only the SAT in a straight running state, it is necessary to return the steering angle to the neutral position by means of steering intervention by a driver, and this is a burden on the driver.

On the other hand, in a case that the SAT is large in a high vehicle speed range, the steering angular velocity tends to be fast in comparison with the low vehicle speed due to the large SAT. However, since an inertia torque is large due to the large inertia moment and the steering wheel is not converged at the neutral position of the steering angle, and is overshot, the vehicle characteristics are sometimes felt unstable.

Thus, it is necessary to compensate the different characteristics depending on the vehicle speed or the steering state. In order to achieve the above requirement, various control methods, which perform an appropriate assist when returning the handle, are proposed. In those handle-returning controls, the electric power steering apparatus as a prior art whose object is to perform the smooth handle-returning control even in the steering intervention by the driver is disclosed in the publication of Japanese Patent No. 4685557 B2 (Patent Document 1).

In the apparatus of Patent Document 1, a controller, which follows the target steering angular velocity, corrects a base target steering angular velocity by multiplying and adding in accordance with the vehicle speed and the steering torque and calculates the target steering angular velocity. In the steering intervention by the driver, uncomfortable feeling for the driver when the driver steers the handle, is reduced by correcting the target steering angular velocity to a direction which the torque is applied.

In order to realize the smooth handle-returning in a state with no hands, it is preferred that a steering angle acceleration does not largely vary and the steering angular velocity at the steering angle neutral position be zero. However, in the apparatus according to Patent Document 1, when the target steering angular velocity is set, although the correction due to the steering torque is performed, the correction due to the assist torque is not performed. Generally, the higher the vehicle speed is, the smaller the assist torque is set. Therefore, in the corrections due to the steering torque and the vehicle speed, there is a problem that a calculation of a preferable correction amount takes time.

To such a problem, in the electric power steering apparatus shown in the publication of Japanese Patent No. 5896091 B1 (Patent Document 2), the target steering angular velocity is calculated by defining a target returning torque depending on the steering angle and the vehicle speed, adding the steering torque and the assist torque to the target returning torque and multiplying the added result with a transfer characteristic depending on a virtual steering system characteristic. At least one control of a proportional control (P-control), an integral control (I-control) and a differential control (D-control) is performed against a deviation between the target steering angular velocity and an actual steering angular velocity. Thereby, the handle-returning control that the driver feels a natural feeling can be realized even in the steering intervention by the driver.

The List of Prior Art Documents

Patent Documents

Patent Document 1: Japanese Patent No. 4685557 B2
Patent Document 2: Japanese Patent No. 5896091 B1

SUMMARY OF THE INVENTION

Problems to be Solved by the Invention

However, in the apparatus according to Patent Document 2, the deviation between the target steering angular velocity and the actual steering angular velocity can be an excessive large value depending on the steering state in the handle-returning control. Consequently, the handle-returning control is performed excessively and the driver may feel uncomfortable.

The present invention has been developed in view of the above-described circumstances, and an object of the present invention is to provide the electric power steering apparatus that can provide the handle-returning control which the uncomfortable feeling for the driver is reduced by limiting the deviation between the target steering angular velocity and the steering angular velocity so that the deviation is not the excessive large value, in the handle-returning control that realizes less uncomfortable feeling for the driver and the smooth handle-returning even when the steering intervention of the driver is performed in the straight running state by the correction based on the steering torque and the vehicle speed in which the vehicle characteristic is considered.

Means for Solving the Problems

The present invention relates to an electric power steering apparatus that calculating a current command value based on a steering torque and a vehicle speed, drives a motor based on the current command value and assist-controls a steering system by a driving-control of the motor, the above-described object of the present invention is achieved by that comprising a handle-returning control section that calculates a target steering angular velocity by using a steering angle, the vehicle speed, the steering torque and the current command value, calculates a handle-returning control current by using a limit-target steering angular velocity which is obtained by limiting the target steering angular velocity depending on a steering angular velocity, and drives the motor by a compensated current command value which is obtained by adding the handle-returning control current to the current command value.

The above-described object of the present invention is efficiently achieved by that: wherein the handle-returning control section comprises a returning-steering angular velocity calculating section that calculates a returning-steering angular velocity by using the steering angle and the vehicle speed, an integration torque calculating section that calculates an integration torque by using the steering torque and the current command value, a steering-system characteristic section that calculates the target steering angular velocity based on a virtual vehicle model by using the returning-steering angular velocity and the integration torque, a target steering angular velocity limiting section that limits the target steering angular velocity by setting a limit value to a pre-limit deviation between the target steering angular velocity and the steering angular velocity depending on the steering angular velocity, a handle-returning control deviation calculating section that calculates a handle-returning control deviation by multiplying a post-limit deviation between the limit-target steering angular velocity and the steering angular velocity with a vehicle speed gain and a steering torque gain, and a handle-returning control current calculating section that performs at least one control calculation of a proportional control calculation, an integral control calculation and a differential control calculation for the handle-returning control deviation, and obtains the handle-returning control current by limiting an output with the vehicle speed gain and the steering torque gain; or wherein the target steering angular velocity limiting section sets the limit value so that a magnitude of the limit value in a case that the pre-limit deviation is a damping deviation which operates so as to converge a motion of a handle is larger than a magnitude of the limit value in a case that the pre-limit deviation is a returning deviation which operates so as to return a handle to a neutral position; or wherein the target steering angular velocity limiting section further sets the limit value so that a magnitude of the limit value in a case that the pre-limit deviation is the damping deviation when steering-forward is smaller than a magnitude of the limit value when steering-backward; or wherein the target steering angular velocity limiting section sets the limit value so that a magnitude of the limit value in a case that the pre-limit deviation is the damping deviation becomes larger when the steering angular velocity is higher; or wherein, in a steering-backward state, the pre-limit deviation whose value is negative when the steering angle is positive or whose value is positive when the steering angle is negative, is set to the returning deviation, and in a state that the steering angular velocity is high, the pre-limit deviation whose value is positive when the steering angle is positive or whose value is negative when the steering angle is negative, is set to the damping deviation; or wherein the limit value is changed in accordance with the vehicle speed; or wherein the limit value is changed in accordance with the steering angle; or wherein the limit value is changed in accordance with the steering angular velocity.

Effect of the Invention

In accordance with the electric power steering apparatus according to the present invention, the handle-returning control, which suppresses the excessive deviation between the target steering angular velocity and the steering angular velocity in the handle-returning control and reduces the uncomfortable feeling, can be provided by calculating the target steering angular velocity by using the steering angle, the vehicle speed, the steering torque and the current command value, and limiting the target steering angular velocity.

BRIEF DESCRIPTION OF THE DRAWINGS

In the accompanying drawings.

MODE FOR CARRYING OUT THE INVENTION

Figure 1:
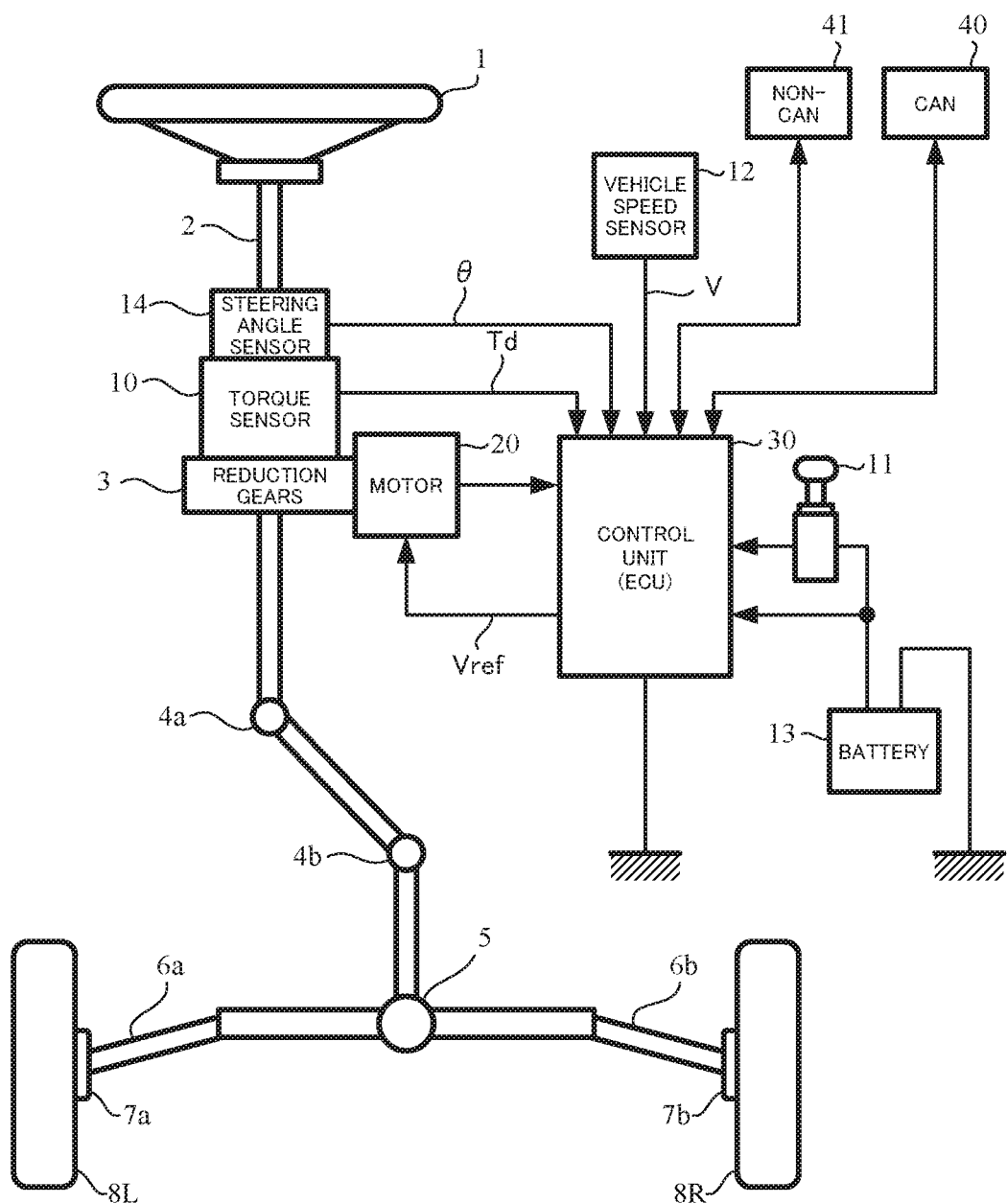
FIG. 1 is a configuration diagram showing a general outline of an electric power steering apparatus.
Figure 2:
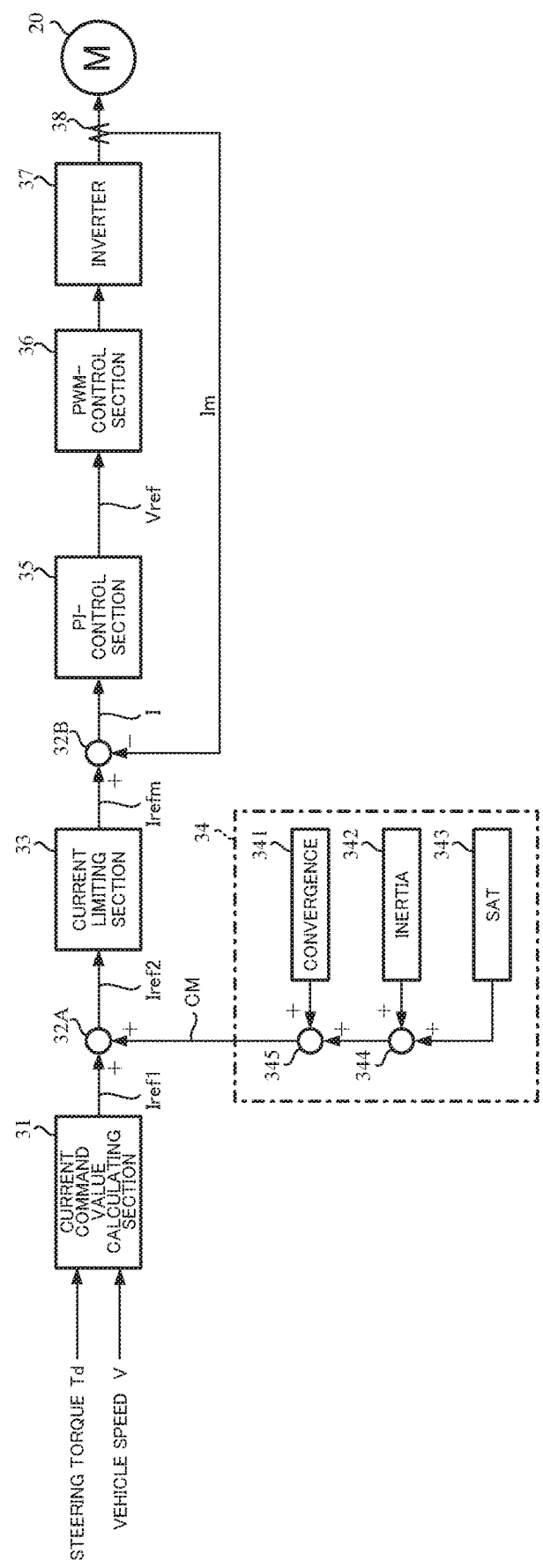
FIG. 2 is a block diagram showing a configuration example of a control system of an electric power steering apparatus.

An operation is impeded due to friction of reduction gears and a rack-and-pinion for transferring an assist torque in an electric power steering apparatus, a handle does not return to a neutral position even when a running state is returned to a straight running state and a vehicle cannot be in the straight running state. In this connection, in a handle-returning control according to the present invention, when the running state is returned to the straight running state, the handle is proactively returned to the neutral position by correcting (compensating) a current command value by using a handle-returning control current depending on a steering angle, vehicle speed and the like. The handle-returning control is performed by calculating a target steering angular velocity based on a simple virtual vehicle model and performing a proportional-integral-differential-control (a PID-control) for a deviation between the target steering angular velocity and a steering angular velocity (an actual steering angular velocity). In the handle-returning control, by limiting the steering angular velocity so that the steering angular velocity follows-up the target steering angular velocity, the deviation is suppressed so as to be less than or equal to a predetermined value, the handle-returning control is suppressed so as not to excessively operate, and the uncomfortable feeling for the steering is reduced.

A simple virtual vehicle model in the present invention is a model that calculates the target steering angle speed $\omega_0$ by applying a vehicle characteristic (a vehicle transfer characteristic) depending on a virtual inertia moment J and a virtual viscosity coefficient C of the steering system to a returning-steering angular velocity (a target value) $\omega t$, which is calculated from the steering angle $\theta$ and the vehicle speed V, the steering torque Td and an assist torque Ta.

Since the virtual inertia moment J and the virtual viscosity coefficient C of the steering system can be set by using the virtual vehicle model (a steering system characteristic section), it is possible to determine the vehicle characteristics, arbitrarily. Further, because the steering intervention by the driver, which is also taken into account for the assist torque Ta in the virtual vehicle model, is considered, the smooth handle-returning can be provided even in a state that the driver steers a handle (a steering wheel).

Here, assuming that static friction, Coulomb friction and an elastic term are not existed in the steering system, an equation of the force balance among a self-aligning torque (an SAT) Sat, the steering torque Td and the assist torque Ta is represented in a below Expression 1.

$$Sat + T_d + T_a = J\frac{d^2\theta}{dt^2} + C\frac{d\theta}{dt} \qquad \text{[Expression 1]}$$

Since the steering angular velocity $\omega$ is a time differential of the steering angle $\theta$, a following Expression 2 is satisfied.

$$\omega = \frac{d\theta}{dt} \quad \text{[Expression 2]}$$

Thus, the target steering angular velocity $\omega$ is set to $\omega_0$ ($\omega=\omega_0$) and a following Expression 3 is satisfied.

$$Sat + T_d + T_a = J\frac{d\omega_o}{dt} + C\omega_o \quad \text{[Expression 3]}$$

Further, Laplace transform is performed to the above Expression 3 and a following Expression 4 is obtained. Solving for the target steering angular velocity $\omega_0$ in the Expression 4, a following Expression 5 is obtained.

$$Sat + T_d + T_a = sJ\omega_o + C\omega_o \quad \text{[Expression 4]}$$

$$\omega_o = \frac{1}{\frac{J}{C}s+1}\left(\frac{Sat}{C} + \frac{T_d + T_a}{C}\right) \quad \text{[Expression 5]}$$

The target steering angular velocity $\omega_0$ is calculated from the above Expression 5. In the Expression 5, "Sat/C" can be considered as the steering angular velocity generated by the SAT, that is, the returning-steering velocity $\omega t$ that is set depending on the vehicle characteristic. "1/{(J/C)s+1}" is a transfer characteristic (hereinafter referred to as "a virtual characteristic") obtained from the virtual vehicle model, and "(Td+Ta)/C" is the steering angular velocity generated by the steering torque Td and the assist torque Ta.

Since the SAT Sat is generally determined by the vehicle speed V and the steering angle $\theta$, the returning-steering velocity $\omega t$ is also set depending on the vehicle speed V and the steering angle $\theta$. The steering torque Td is detected by a torque sensor and the assist torque Ta can be calculated from the current command value Iref, considering a motor torque constant Kt. Thus, a sum torque (an integration torque) Tc, which is added the assist torque Ta to the steering torque Td, is divided by the viscosity coefficient C and then the steering angular velocity generated by the integration torque Tc (hereinafter to as "an integration steering angular velocity") $\omega c$ is calculated. The target steering angular velocity $\omega_0$ is obtained by adding the integration steering angular velocity $\omega c$ to the returning-steering angular velocity $\omega t$, and transforming the added result by using the virtual transfer characteristic.

In the present invention, the calculated target steering angular velocity $\omega_0$ is limited so that a deviation (a pre-limit deviation) between the target steering angular velocity $\omega_0$ and the steering angular velocity $\omega$ is not an excessive large value. That is, a limit value to the deviation is set so that the deviation is not larger than the limit value. The limit value is set so that a magnitude of the limit value (hereinafter referred to as "a damping limit value") which is set in a case that the deviation (a damping deviation) operates so as to converge a motion of the handle is larger than a magnitude (an absolute value) of the limit value (hereinafter referred to as "a returning limit value") which is set in a case that the deviation (a returning deviation) operates so as to return the handle to a neutral position (a neutral point). Since a compensation amount that is needed for the convergence of the handle becomes larger when the steering angular velocity $\omega$ is higher, the magnitude of the damping limit value is set to become larger when the steering angular velocity $\omega$ is higher. The magnitude of the damping limit value at a time of a steering-forward maneuver is set to be smaller than the magnitude of the damping limit value at a time of a steering-backward maneuver so as not to obstruct the steering by the driver in the case of the steering-forward.

As well, since the returning characteristic of the handle and the convergence of the vehicle are different depending on the vehicle speed V, an output of the handle-returning control is changeable, for example, by multiplying with a vehicle speed gain depending on the vehicle speed V. When a proportion of a friction torque to the steering torque Td that is applied to a column shaft is relatively large, the handle-returning control is mainly needed, and when the steering torque Td is large, the large output in the handle-returning control is not needed. Therefore, the output of the handle-returning control is changeable, for example, by multiplying with a steering torque gain Th that becomes smaller when the steering torque Td is larger.

By performing such a control depending on the deviation between the target steering angular velocity $\omega_0$ and the steering angular velocity $\omega$, the smooth handle-returning can be realized and the handle-returning control that the uncomfortable feeling is reduced can be provided even when the driver steers the handle.

Embodiments according to the present invention will be described with reference to the drawings.

Figure 3:
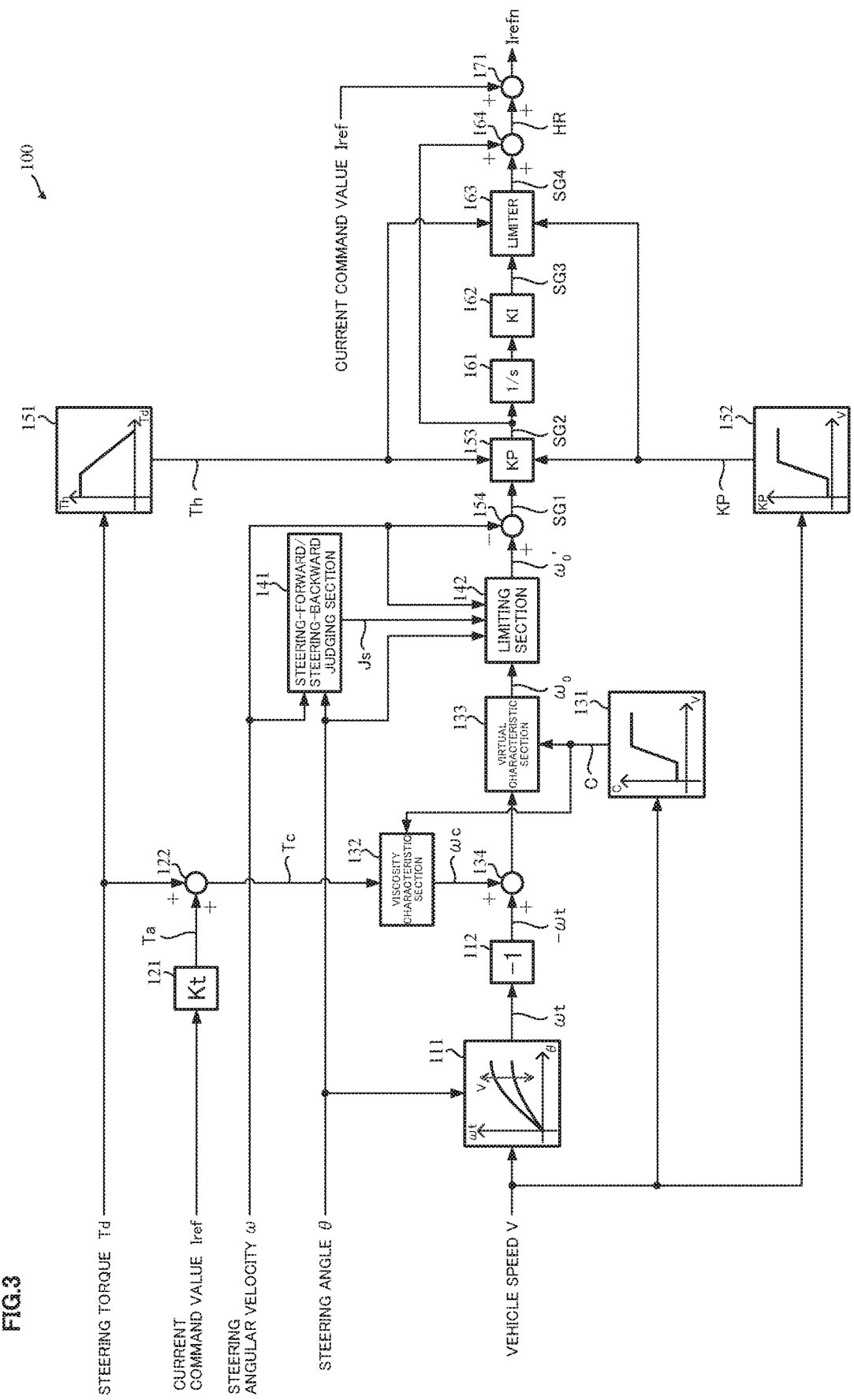
FIG. 3 is a block diagram showing a configuration example of the present invention (the first embodiment)

FIG. 3 shows a configuration example of a handle-returning control section 100 according to the present invention (the first embodiment). The steering torque Td inputted into the handle-returning control section 100 is inputted into a steering torque gain section 151 and an adding section 122. The current command value Iref is inputted into a motor torque constant section 121 and an adding section 171. The steering angular velocity $\omega$ is inputted into a steering-forward/steering-backward judging section 141, a limiting section 142 and a subtracting section 154. The steering angle $\theta$ is inputted into a returning-steering angular velocity calculating section 111, the steering-forward/steering-backward judging section 141 and the limiting section 142. The vehicle speed V is inputted into the returning-steering angular velocity calculating section 111, a viscosity coefficient outputting section 131 and a vehicle speed gain section 152.

Figure 4:
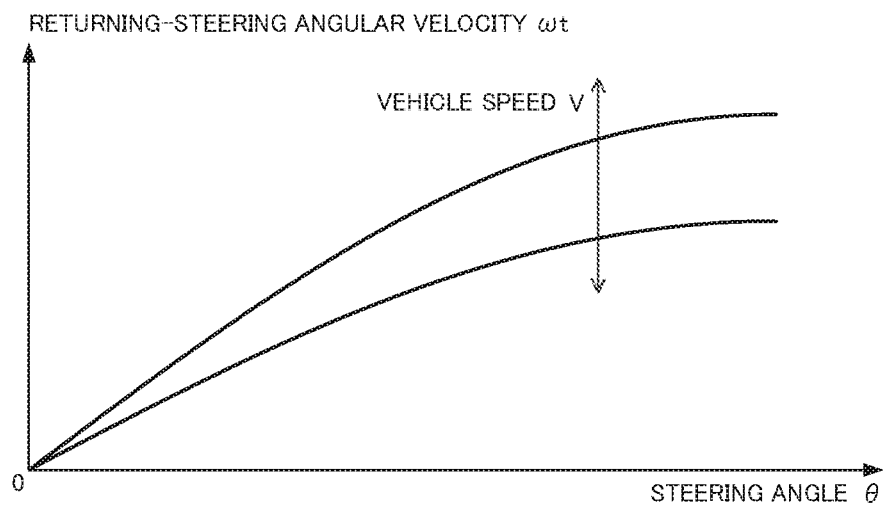
FIG. 4 is a characteristic diagram showing an output example of a returning-steering angular velocity calculating section.

The returning-steering angular velocity calculating section 111 calculates the returning-steering angular velocity $\omega t$ depending on the vehicle speed V and the steering angle $\theta$. For example, based on the characteristic shown in FIG. 4, the returning-steering angular velocity $\omega t$ is determined by the inputted vehicle speed V and the inputted steering angle $\theta$. In the characteristic shown in FIG. 4, since the SAT becomes larger depending on the steering angle $\theta$, the returning-steering angular velocity $\omega t$ also becomes larger when the steering angle $\theta$ is larger. The returning-steering angular velocity $\omega t$ can be larger or smaller when the vehicle speed V is higher. As described above, since the "Sat/C" can be considered as the returning-steering angular velocity $\omega t$, the returning-steering angular velocity $\omega t$ may be calculated by estimating or measuring the SAT Sat and dividing the SAT Sat by the viscosity coefficient C.

The current command value Iref inputted into the motor torque constant section 121 is multiplied with a motor torque constant Kt, and the multiplied result is outputted as the assist torque Ta. The steering torque Td is added to the assist torque Ta at the adding section 122, and the added result is the integration torque Tc.

Figure 5:
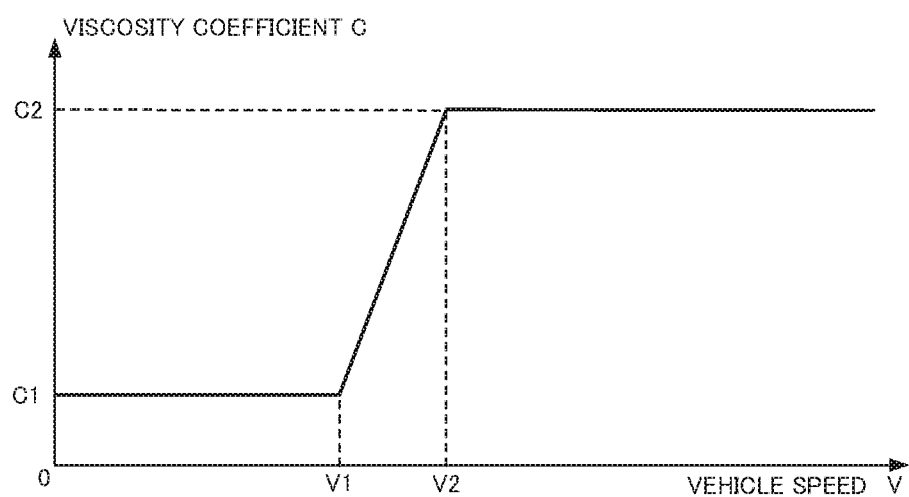
FIG. 5 is a characteristic diagram showing an output example of a viscosity coefficient outputting section.

The viscosity coefficient outputting section 131 determines the viscosity coefficient C depending on the vehicle speed V. For example, the viscosity coefficient C has a characteristic shown in FIG. 5. The viscosity coefficient C is a small constant viscosity coefficient C1 when the vehicle speed V is lower than a vehicle speed V1. The viscosity coefficient C gradually increases when the vehicle speed V is equal to or higher than the vehicle speed V1 and is lower than a vehicle speed V2 (>V1). The viscosity coefficient C is a large constant viscosity coefficient C2 when the vehicle speed V is equal to or higher than the vehicle speed V2. The characteristic of the viscosity coefficient C is not limited to the above characteristic. The viscosity coefficient C is inputted into a viscosity characteristic section 132 and a virtual characteristic section 133.

The viscosity characteristic section 132 calculates the integration steering angular velocity $\omega c$ by dividing the integration torque by the viscosity coefficient C. At an adding section 134, the integration steering angular velocity $\omega c$ is added to the inverted returning-steering angular velocity $-\omega t$ whose sign is inverted at an inverting section 112. The added result is inputted into the virtual characteristic section 133. The virtual characteristic section 133 calculates the target steering angular velocity $\omega_0$ from the above input by using the virtual characteristic that is defined by the inertia moment J and the viscosity coefficient C. That is, the above Expression 5 is executed at the adding section 122, the viscosity characteristic section 132, the inverting section 112, the adding section 134 and the virtual characteristic section 133. If the returning-steering angular velocity $\omega t$ is calculated at the returning-steering angular velocity calculating section 111 so that the returning-steering angular velocity $\omega t$ varies in an inverse direction to the integration steering angular velocity $\omega c$, the inverting section 112 is removed.

The steering-forward/steering-backward judging section 141 judges whether the handle is steered in a steering-forward direction, is steered in a steering-backward direction, or is in a steering holding state based on the steering angular velocity $\omega$ and the steering angle $\theta$, and outputs a judgement result Js which indicates "steering-forward", "steering-backward", or "steering holding", respectively. That is, in a case that the steering angle $\theta$ or the steering angular velocity $\omega$ is substantially zero, it is judged that the state is "steering holding". If the state is not "steering holding", in a case that the sign of the steering angle $\theta$ is the same sign of the steering angular velocity $\omega$, it is judged that the state is "steering-forward", and in a case that the sign of the steering angle $\theta$ is not the same sign of the steering angular velocity $\omega$, it is judged that the state is "steering-backward".

The limiting section 142 limits the target steering angular velocity $\omega_0$ based on the judgement result Js from the steering-forward/steering-backward judging section 141, the steering angular velocity $\omega$ and the steering angle $\theta$, and outputs a limit-target steering angular velocity $\omega_0'$. A deviation (a post-limit deviation) SG1 between the limit-target steering angular velocity $\omega_0'$ and the steering angular velocity $\omega$ (SG1=$\omega_0'$−$\omega$) is calculated at the subtracting section 154. Details of the limiting section 142 are described later.

Figure 6:
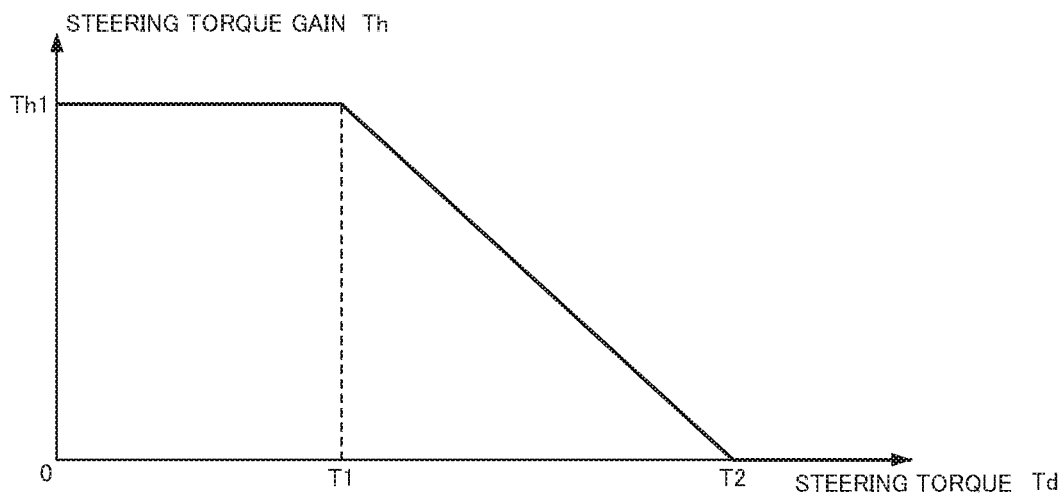
FIG. 6 is a characteristic diagram showing an output example of a steering torque gain section.

The steering torque gain section 151 outputs a steering torque gain Th depending on the steering torque Td. For example, the steering torque gain Th has a characteristic shown in FIG. 6. The steering torque gain Th is a constant gain Th1 when the steering torque Td is smaller than a steering torque T1, gradually decreases when the steering torque Td is equal to or larger than the steering torque T1 and is smaller than a steering torque T2, and is zero when the steering torque Td is equal to or larger than the steering torque T2.

Figure 7:
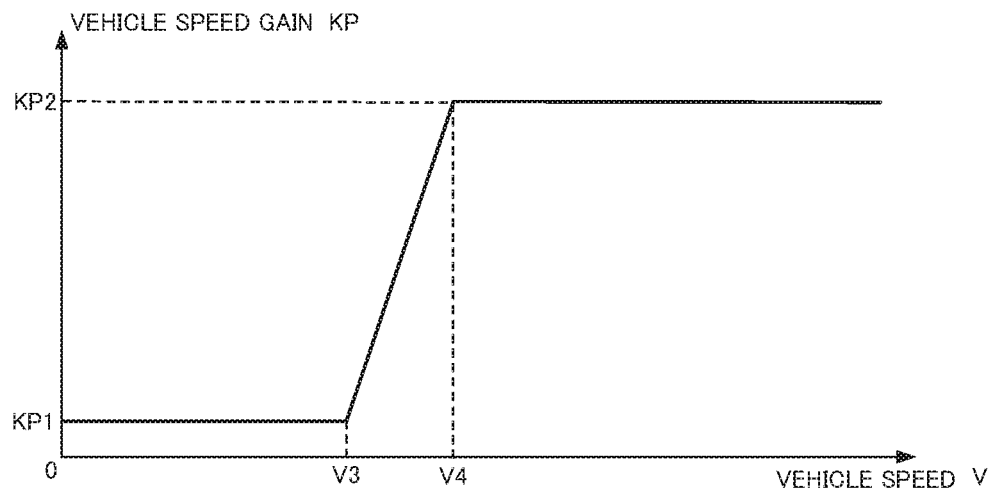
FIG. 7 is a characteristic diagram showing an output example of a vehicle speed gain section.

The vehicle speed gain section 152 outputs the vehicle speed gain KP depending on the vehicle speed V. For example, the vehicle speed gain KP has a characteristic shown in FIG. 7. The vehicle speed gain KP is a small constant gain KP1 when the vehicle speed V is lower than a vehicle speed V3, gradually increases when the vehicle speed V is equal to or higher than the vehicle speed V3 and is lower than a vehicle speed V4, and is a large constant gain KP2 when the vehicle speed V is equal to or higher than the vehicle speed V4. However, the vehicle speed gain KP is not limited to the above characteristic.

The steering torque gain Th and the vehicle speed gain KP are inputted into a multiplying section 153 and a limiter 163.

At the multiplying section 153, the deviation SG1 is multiplied with the steering torque gain Th and the vehicle speed gain KP, and the multiplied result is defined as a handle-returning control deviation SG2. The handle-returning control deviation SG2 from the multiplying section 153 is inputted into an adding section 164 and an integral control section 161 for improving the characteristic. The handle-returning control deviation SG2 inputted into the integral control section 161 is inputted into the limiter 163 through an integral gain section 163. A signal SG4 whose output is limited depending on the steering torque gain Th and the vehicle speed gain KP at the limiter 163, is inputted into the adding section 164. The signal SG4 is added to the handle-returning control deviation SG2 at the adding section, and the added result is defined as a handle-returning control current HR. The handle-returning control current HR is outputted from the adding section 164. The integral compensates a low steering torque range that is easily affected by the friction, and specifically the integral exerts in the strong friction range with no hands. The handle-returning control current HR is added to the current command value Iref at an adding section 171, and the current command value Iref is corrected (compensated). The corrected compensated current command value Irefn is inputted into a motor driving system. In order to remove the noise, the handle-returning control current HR is passed through, for example, a low pass filter (LPF), and may be inputted into the adding section 171.

In the configuration example shown in FIG. 3, an integration torque calculating section comprises the motor torque constant section 121 and the adding section 122. A steering-system characteristic section comprises the viscosity coefficient outputting section 131, the viscosity characteristic section 132, the virtual characteristic section 133 and the adding section 134. A target steering angular velocity limiting section comprises the steering-forward/steering-backward judging section 141 and the limiting section 142. A handle-returning control deviation calculating section comprises the steering torque gain section 151, the vehicle speed gain section 152, the multiplying section 153 and the subtracting section 154. A handle-returning control current calculating section comprises the integral control section 161, the integral gain section 162, the limiter 163 and the adding section 164.

The details of the limiting section 142 will be described.

The limiting section 142 limits the target steering angular velocity $\omega_0$ by setting the limit value for the deviation so that the deviation (the pre-limit deviation) between the target steering angular velocity $\omega_0$ and the steering angular velocity $\omega$ does not become an excessive large value. The limit value is set so that the magnitude of the damping limit value is larger than that of the returning limit value (hereinafter referred to as "condition 1"). The limit value is further set so that the magnitude of the damping limit value is larger when the steering angular velocity ω is higher (hereinafter referred to as "condition 2"). The limit value is still further set so that the magnitude of the damping limit value in the steering-forward maneuver is smaller than the magnitude of the damping limit value in the steering-backward maneuver (hereinafter referred to as "condition 3").

Figure 8A:
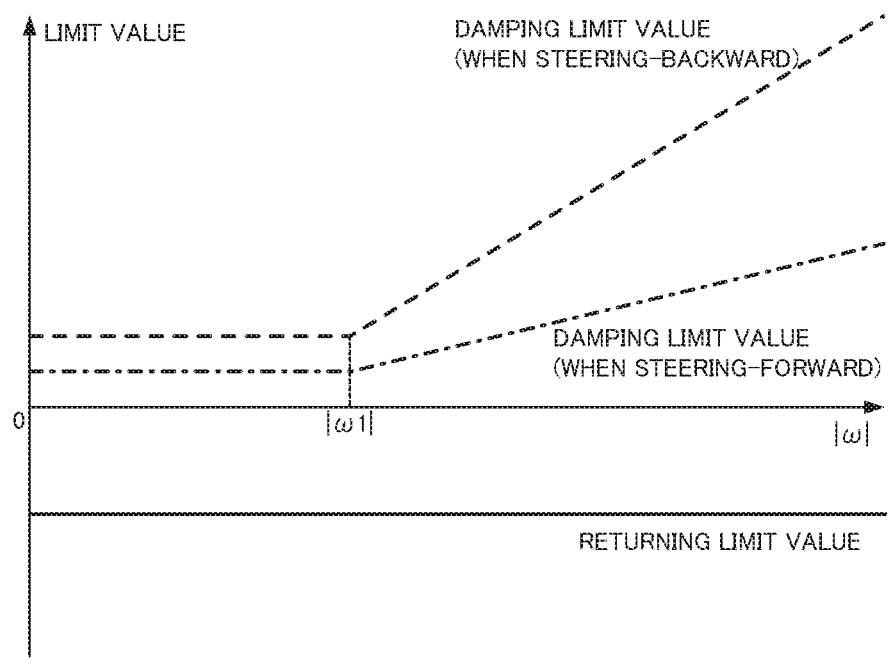
FIGS. 8A and 8B are characteristic diagrams showing setting examples of a limit value.
Figure 8B:
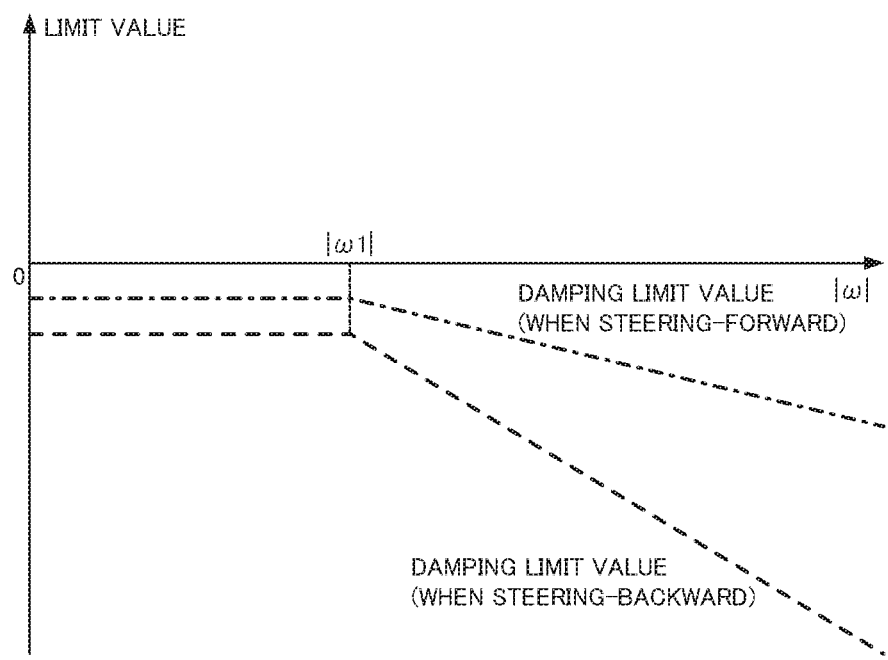

In a situation of the steering-backward maneuver, the limit value to the deviation whose value is negative when the steering angle θ is positive, or whose value is positive when the steering angle θ is negative, is set as the returning limit value. In a situation that the steering angular velocity ω is higher, the limit value to the deviation whose value is positive when the steering angle θ is positive, or whose value is negative when the steering angle θ is negative, is set as the damping limit value. Further, different damping limit values are prepared for the steering-forward and the steering-backward, and then the above three conditions are satisfied. For example, in a case that the steering angle θ is positive, the limit value has a characteristic shown in FIG. 8A. FIGS. 8A and 8B are the characteristic diagrams that a vertical axis is the limit value and a horizontal axis is an absolute value |ω| of the steering angular velocity ω. A solid line shows the returning limit value. A broken line shows the damping limit value (hereinafter referred to as "a steering-backward damping limit value") at the steering-backward maneuver. A dashed dotted line shows the damping limit value (hereinafter referred to as "a steering-forward damping limit value") at the steering-forward maneuver.

As well, the damping limit value is a term when the steering angular velocity ω is high (the absolute value |ω| of the steering angular velocity is large). In the following, the damping limit value is used even in a case that the steering angular velocity ω is low. As shown in FIG. 8A, the returning limit value is a constant value. The damping limit value is a constant value (the value may be zero) when |ω| is smaller than a predetermined value |ω1|, and increases linearly to |ω| when |ω| is equal to or larger than the value |ω1|. The steering-forward damping limit value is smaller than the steering-backward damping limit value. In a case that the steering angle θ is negative, the sign of the limit values is inversed and the limit values have a characteristic shown in FIG. 8B. The characteristic of the limit values is not limited to the characteristic of FIGS. 8A and 8B. If the characteristic satisfies the above three conditions 1 to 3, the characteristic including a curved line or the like may be used. Further, the characteristic that satisfies at least the condition 1 may be used. In a case that the characteristic satisfies at least the condition 1, the damping limit value may be a constant value.

Figure 9:
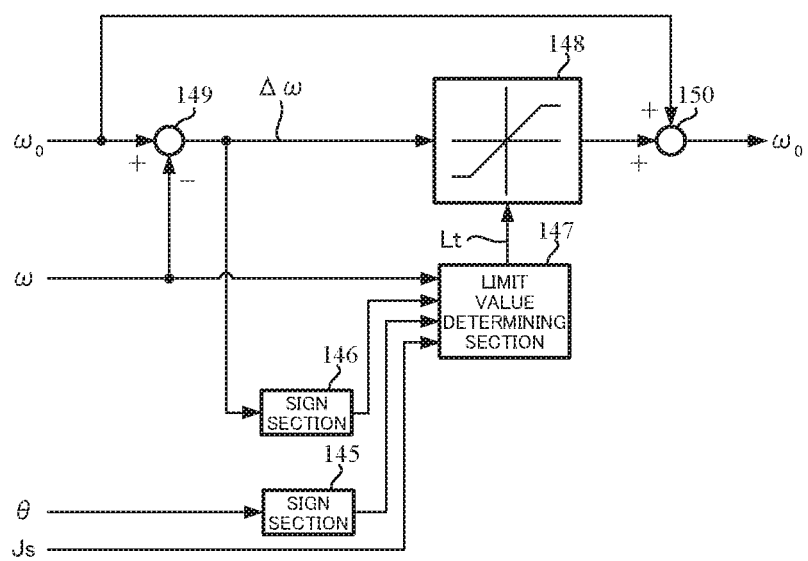
FIG. 9 is a block diagram showing a configuration example of a limiting section (the first embodiment)

The limiting section 142 limits the target steering angular velocity ω₀ by using the characteristic shown in FIGS. 8A and 8B. A configuration example of the limiting section 142 is shown in FIG. 9. At first, the limiting section 142 calculates the deviation Δω between the target steering angular velocity ω₀ and the steering angular velocity ω at a subtracting section 149. The sign of the steering angle θ and the sign of the deviation Δω are obtained at sign sections 145 and 146, respectively. The limit value for use at a limit executing section 148 is determined at a limit value determining section 147 based on the sign of the steering angle θ, the sign of the deviation Δω and the judgement result Js from the steering-forward/steering-backward judging section 141. A limit executing section 148 limits the deviation Δω by using the determined limit value Lt. That is, in a case that the judgement result Js is "steering-backward", when the steering angle θ is positive and the deviation Δω is positive, the steering-backward damping limit value of FIG. 8A (hereinafter referred to as "steering-backward damping limit value 1") is used as the limit value. When the steering angle θ is positive and the deviation Δω is negative, the returning limit value of FIG. 8A is used as the limit value. When the steering angle θ is negative and the deviation Δω is positive, the returning limit value is used as the limit value. When the steering angle θ is negative and the deviation Δω is negative, the steering-backward damping limit value of FIG. 8B (hereinafter referred to as "steering-backward damping limit value 2") is used as the limit value.

In a case that the judgement result Js is "steering-forward", when the steering angle θ is positive and the deviation Δω is positive, the steering-forward damping limit value of FIG. 8A (hereinafter referred to as "steering-forward damping limit value 1") is used as the limit value. When the steering angle θ is positive and the deviation Δω is negative or when the steering angle θ is negative and the deviation Δω is positive, the returning limit value is used as the limit value. When the steering angle θ is negative and the deviation Δω is negative, the steering-forward damping limit value of FIG. 8B (hereinafter referred to as "steering-forward damping limit value 2") is used as the limit value. Further, in a case that the judgement result Js is "steering holding", the returning limit value is used as the limit value. The limited deviation Δω is added to the target steering angular velocity ω₀ at the adding section 150, and the limit-target steering angular velocity ω₀' is calculated. The limiting section 142 may not have the configuration shown in FIG. 9, and the function of the limiting section 142 may be realized by using a program in the CPU.

In the limiting section 142, a reason for limiting the target steering angular velocity ω₀ will be described in a case that the steering angle θ is positive, as an example.

Figure 10A:
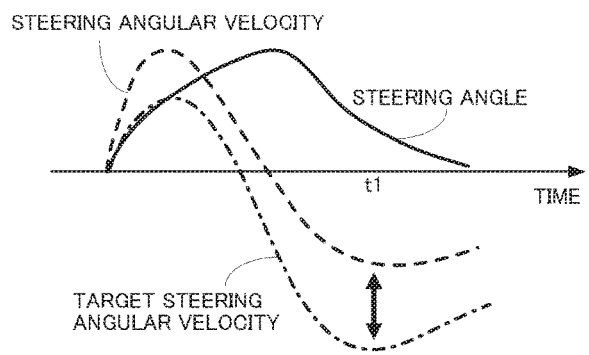
FIGS. 10A, 10B and 10C are graphs showing time changing examples of a steering angle, a steering angular velocity and a target steering angular velocity.
Figure 10B:
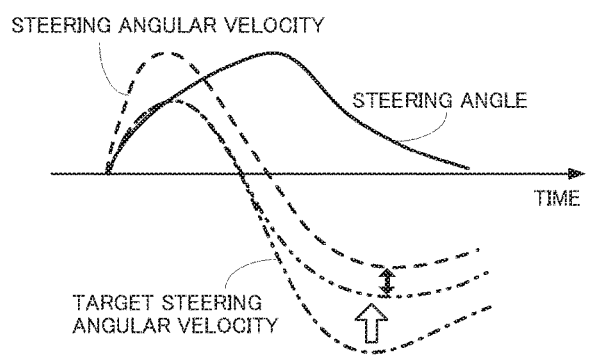
Figure 10C:
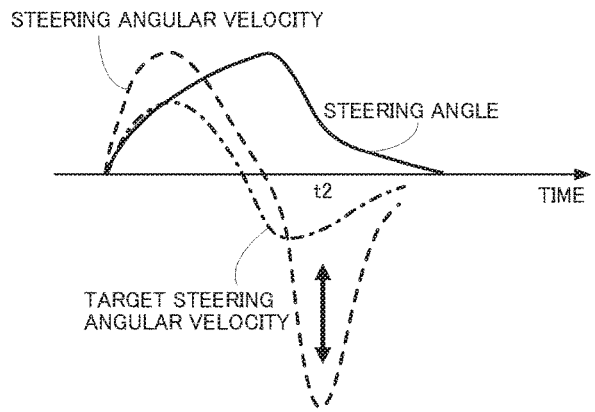
Figure 10D:
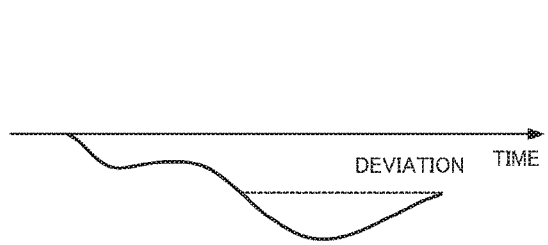
FIGS. 10D and 10E are graphs showing time changing examples of a deviation.
Figure 10E:
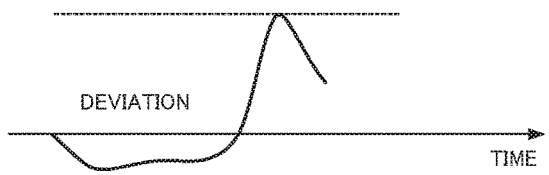

FIGS. 10A, 10B and 10C are graphs that show respective time change characteristics of the steering angle θ, the steering angular velocity ω and the target steering angular velocity ω₀. The solid line shows the steering angle θ, the broken line shows the steering angular velocity ω and the dashed dotted line shows the target steering angular velocity ω₀. FIG. 10D is a graph that shows a time change characteristic of the deviation Δω between the target steering angular velocity ω₀ and the steering angular velocity ω in FIGS. 10A and 10B, and FIG. 10E is a graph that shows a time change characteristic of the deviation Δω in FIG. 10C.

FIG. 10A shows the case that the limitation by the limiting section 142 is not worked, and the deviation Δω is a large value near a time point t1. Thereby, the compensation amount by the handle-returning control is large and the uncomfortable feeling for the driver can be occurred. In a case that the magnitude of the steering angular velocity ω is smaller than that of the target steering angular velocity ω₀, the target steering angular velocity ω₀ is limited as shown in the dashed-two dotted line of FIG. 10B so that the deviation Δω does not become such a large value. In this case, as shown in FIG. 10D, the steering angle θ is positive and the deviation Δω is negative. Since the compensation amount is outputted in a direction that the handle is returned to a neutral position, the deviation Δω is limited as shown in the dotted line of FIG. 10D so that the compensation amount is not an excessive large value.

In a case that the magnitude of the steering angular velocity ω is larger than that of the target steering angular velocity ω₀ near a time point t2 in FIG. 10C, the deviation Δω is large. However, in this case, in order that steep returning is suppressed and the deviation $\Delta\omega$ keeps to a large value, the limitation of the target steering angular velocity $\omega_0$ is released (the limitation is hardly performed). That is, in this case, as shown in FIG. 10E, the steering angle $\theta$ is positive and the deviation $\Delta\omega$ is positive. Since the compensation amount is outputted in a direction that the motion of the handle is converged (the direction that the returning is suppressed), the deviation $\Delta\omega$ is not limited. Since the control is performed based on the deviation $\Delta\omega$, the larger the deviation $\Delta\omega$ is, the larger the output of the compensation amount is. Accordingly, the output to the direction that the motion of the handle is converged can be larger than the output to the direction that the handle is returned to the neutral position.

In such a configuration, the operation example will be described with reference to flowcharts of FIGS. 11 and 12.

At first, the steering torque Td, the current command value Iref, the vehicle speed V, the steering angle $\theta$ and the steering angular velocity $\omega$ are inputted (read) (Step S1), and the steering torque gain section 151 outputs the steering torque gain Th (Step S2). The motor torque constant section 121 calculates the assist torque Ta by multiplying the current command value Iref with the motor torque constant Kt (Step S3). The adding section 122 calculates the integration torque Tc by adding the steering torque Td to the assist torque Ta (Step S4), and the integration torque Tc is outputted to the viscosity characteristic section 132.

The returning-steering angular velocity calculating section 111 calculates the returning-steering angular velocity $\omega t$ based on the inputted steering angle $\theta$ and the inputted vehicle speed V (Step S5). The inverting section 112 inverts the sign of the returning-steering angular velocity $\omega t$ (Step S6), and the inverted returning-steering angular velocity is inputted into the adding section 134. The vehicle speed gain section 152 outputs the vehicle speed gain KP depending on the vehicle speed V (Step S7), and the viscosity coefficient outputting section 131 outputs the viscosity coefficient C depending on the vehicle speed V (Step S8). The viscosity coefficient C is inputted into the viscosity characteristic section 132 and the virtual characteristic section 133. The viscosity characteristic section 132 calculates the integration steering angular velocity $\omega c$ by dividing the inputted integration torque Tc by the viscosity coefficient C (Step S9), and outputs the integration steering angular velocity $\omega c$ to the adding section 134. The adding section 134 adds the inverted returning-steering angular velocity "$-\omega t$" to the integration steering angular velocity $\omega c$ (Step S10). Further, the virtual characteristic section 133 calculates the target steering angular velocity $\omega_0$ by using the virtual characteristic (Step S11), and the target steering angular velocity $\omega_0$ is inputted into the limiting section 142.

The steering-forward/steering-backward judging section 141 inputs the steering angular velocity $\omega$ and the steering angle $\theta$, judges the steering direction of the handle based on the steering angular velocity $\omega$ and the steering angle $\theta$ (Step S12) and outputs the judgement result Js.

The limiting section 142 inputs the steering angular velocity $\omega$, the steering angle $\theta$, the target steering angular velocity $\omega_0$ and the judgement result Js and performs the limiting process (Step S13). The limiting process will be described with reference to the flowchart of FIG. 12.

The limiting section 142 calculates the deviation $\Delta\omega$ between the target steering angular velocity $\omega_0$ and the steering angular velocity $\omega$ (Step S101). Then, the sign of the steering angle $\theta$ and the sign of the deviation $\Delta\omega$ are obtained at the sign sections 145 and 146, respectively. The judgement result Js is verified at the limit value determining section 147 (Step S102). In a case that the judgement result Js is "steering-backward", when the steering angle $\theta$ is positive (Step S103) and the deviation $\Delta\omega$ is positive (Step S104), the deviation $\Delta\omega$ is limited by using the steering-backward damping limit value 1 at the limit executing section 148 (Step S105). When the steering angle $\theta$ is positive (Step S103) and the deviation $\Delta\omega$ is negative (Step S104), the deviation $\Delta\omega$ is limited by using the returning limit value (Step S106). When the steering angle $\theta$ is negative (Step S103) and the deviation $\Delta\omega$ is positive (Step S107), the deviation $\Delta\omega$ is limited by using the returning limit value (Step S108). When the steering angle $\theta$ is negative (Step S103) and the deviation $\Delta\omega$ is negative (Step S107), the deviation $\Delta\omega$ is limited by using the steering-backward damping limit value 2 (Step S109).

In a case that the judgement result Js is "steering-forward", when the steering angle $\theta$ is positive (Step S110) and the deviation $\Delta\omega$ is positive (Step S111), the deviation $\Delta\omega$ is limited by using the steering-forward damping limit value 1 (Step S112). When the steering angle $\theta$ is positive (Step S110) and the deviation $\Delta\omega$ is negative (Step S111), the deviation $\Delta\omega$ is limited by using the returning limit value (Step S113). When the steering angle $\theta$ is negative (Step S110) and the deviation $\Delta\omega$ is positive (Step S114), the deviation $\Delta\omega$ is limited by using the returning limit value (Step S115). When the steering angle $\theta$ is negative (Step S110) and the deviation $\Delta\omega$ is negative (Step S114), the deviation $\Delta\omega$ is limited by using the steering-forward damping limit value 2 (Step S116).

In a case that the judgement result Js is "steering holding", the deviation $\Delta\omega$ is limited by using the returning limit value (Step S117). The limit method to the deviation $\Delta\omega$ at the limit executing section 148 is as follows. In a case that the deviation $\Delta\omega$ is larger than the limit value (the absolute value of the deviation $\Delta\omega$ is larger than the absolute value of the limit value), the deviation $\Delta\omega$ is set to the limit value. In a case that the deviation $\Delta\omega$ is not larger than the limit value, the deviation $\Delta\omega$ is not changed. The adding section 150 adds the limited deviation $\Delta\omega$ to the target steering angular velocity $\omega_0$, and calculates the limit-target steering angular velocity $\omega_0'$ (Step S118).

The limit-target steering angular velocity $\omega_0'$ is addition-inputted into the subtracting section 154 and the deviation SG1 between the target steering angular velocity $\omega_0'$ and the steering angular velocity $\omega_0$ that is subtraction-inputted into the subtracting section 154 is calculated (Step S14). The deviation SG1 is inputted into the multiplying section 153. The steering torque gain Th and the vehicle speed gain KP are inputted into the multiplying section 153. The handle-returning control deviation SG2 is calculated by multiplying the deviation SG2 with the above values (Step S15). The handle-returning control deviation SG2 is integral-processed at the integral section 161 (Step S16). Further, the integral-processed handle-returning control deviation is multiplied with the integral gain KI (Step S17) and is limit-processed at the limiter 163 (Step S18).

The signal SG4, which is limit-processed at the limiter 163, is inputted into the adding section 164, and is added to the handle-returning control deviation SG2 (Step S19). The adding section 164 outputs the handle-returning control current HR (Step S20). The adding section 171 adds the handle-returning control current HR to the current command value Iref, corrects the current command value Iref and outputs the compensated current command value Irefn (Step S21).

Figure 11:
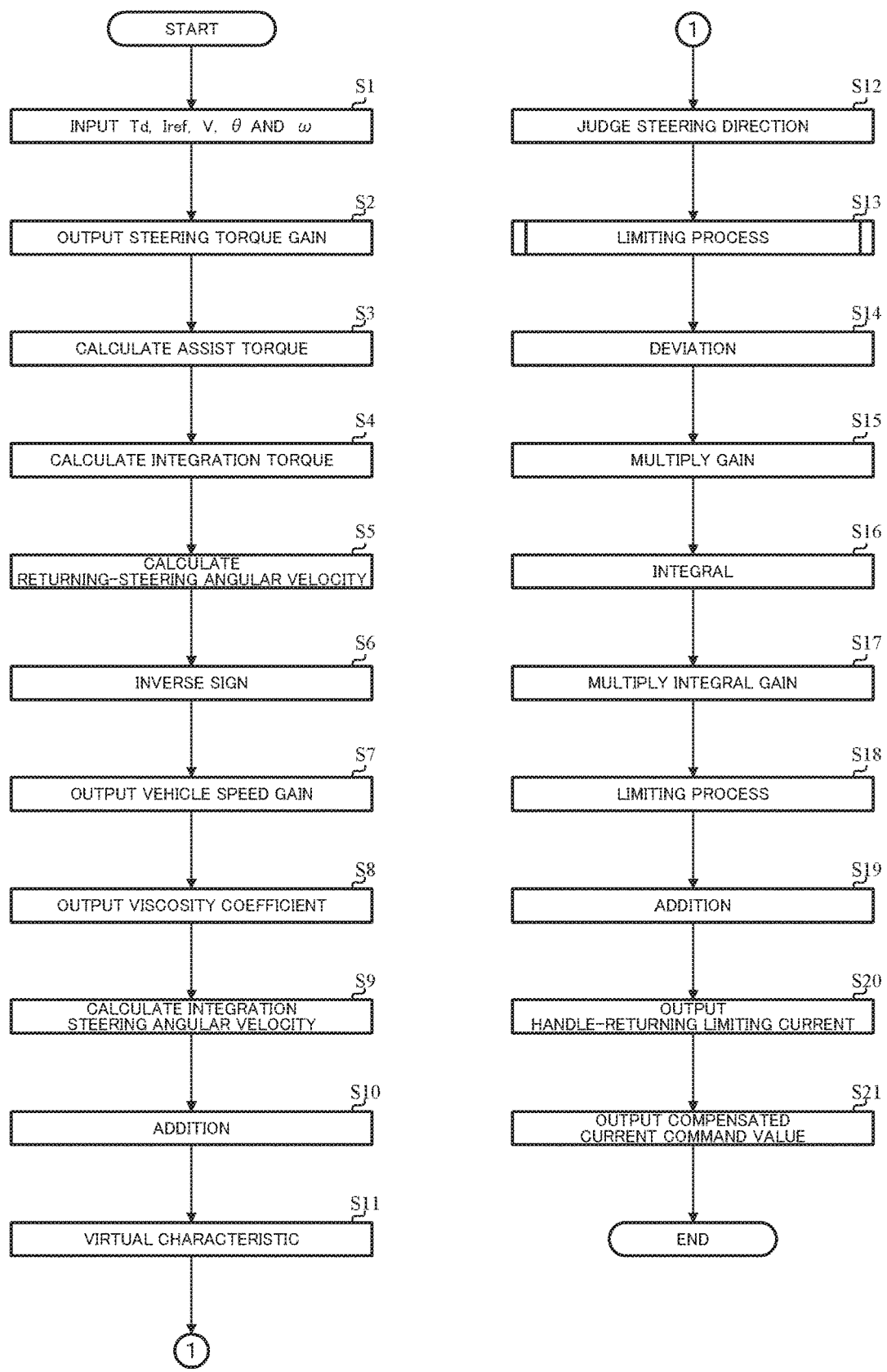
FIG. 11 is a flowchart showing an operation example of the present invention (the first embodiment)
Figure 12:
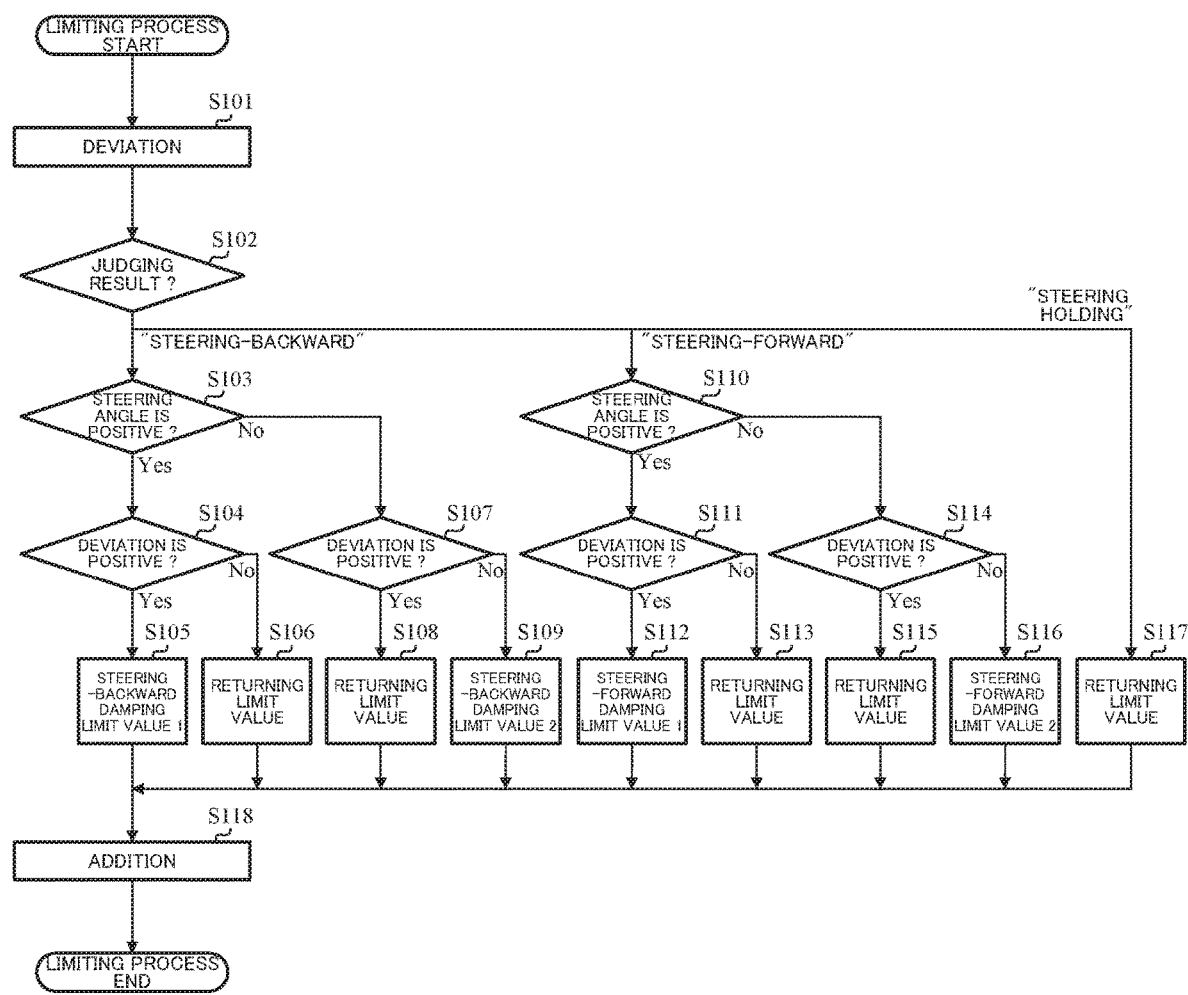
FIG. 12 is a flowchart showing an operation example of a limiting process (the first embodiment)

Besides, the orders of the data inputs, calculations and processes in FIGS. 11 and 12 are appropriately changeable.

The limit value to the deviation between the target steering angular velocity and the steering angular velocity is also changeable depending on the vehicle speed, the steering angle and/or the steering angular velocity.

The SAT is changed due to the vehicle speed and the assist torque is also changed due to the vehicle speed in the general vehicle speed sensitive type electric power steering apparatus. Accordingly, since the handle returning is also varied due to the above change, it is possible to realize the smooth handle-returning in the wide vehicle speed range by changing the limit value depending on the vehicle speed.

By changing the limit value depending on the steering angle, in an off-center range that the vehicle characteristic is largely emerged, a more excellent control effect can be obtained in both cases that the handle is returned to the neutral position and the motion of the handle is converged. A more excellent control effect can also be expected even in an on-center range that the influence of the friction is large.

As shown in FIGS. 8A and 8B, although the limit value is changed to some extent depending on the steering angular velocity, in order to generate a reaction force feeling when transiting from the steering-forward to the steering-backward, the limit value is further changed depending on the steering angular velocity. When the steering is transited from the steering-forward to the steering-backward, the region that the steering angular velocity is zero is existed, that is, the steering holding region is existed though the time length of the steering holding is different. Therefore, it is possible to generate the reaction force at a time of the steering holding by changing the limit value depending on the steering angular velocity. Thereby, the effect that the static friction is compensated is also obtained.

Figure 13:
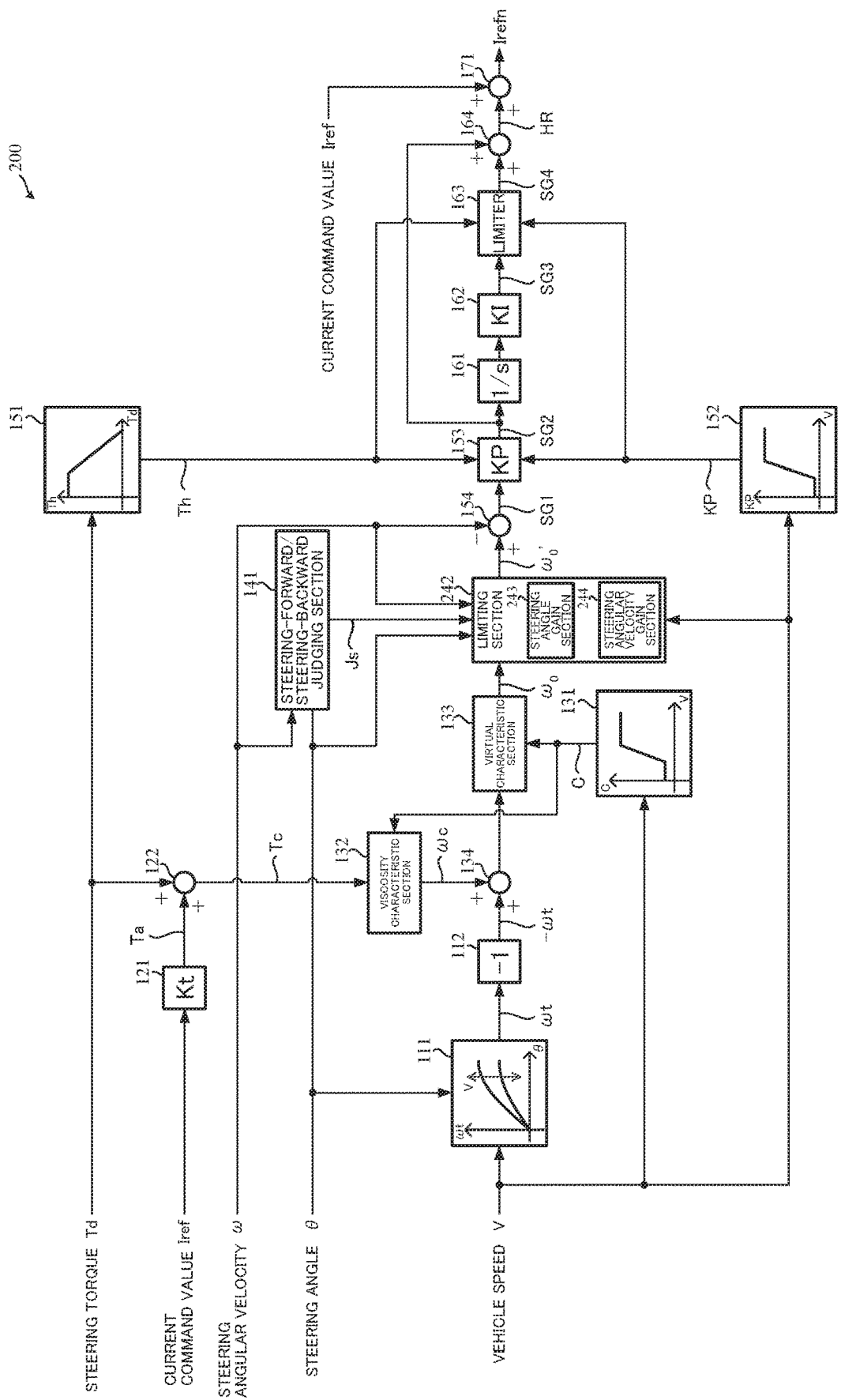
FIG. 13 is a block diagram showing a configuration example of the present invention (the second embodiment)

FIG. 13 shows a configuration example (the second embodiment) of the handle-returning control section 200 in a case that the limit value is changed due to the vehicle speed, the steering angle and the steering angular velocity. Comparing with the configuration example of the first embodiment shown in FIG. 3, the limiting section 142 is replaced with the limiting section 242. The vehicle speed V is also inputted into the limiting section 242. Other configurations are the same as those of the first embodiment, and the explanation is omitted.

In order to change the limit value due to the vehicle speed, the limiting section 242 sets the limit value due to any vehicle speed. In order to change the limit value due to the steering angle and the steering angular velocity, the limiting section 242 comprises a steering angle gain section 243 and a steering angular velocity gain section 244.

Figure 14:
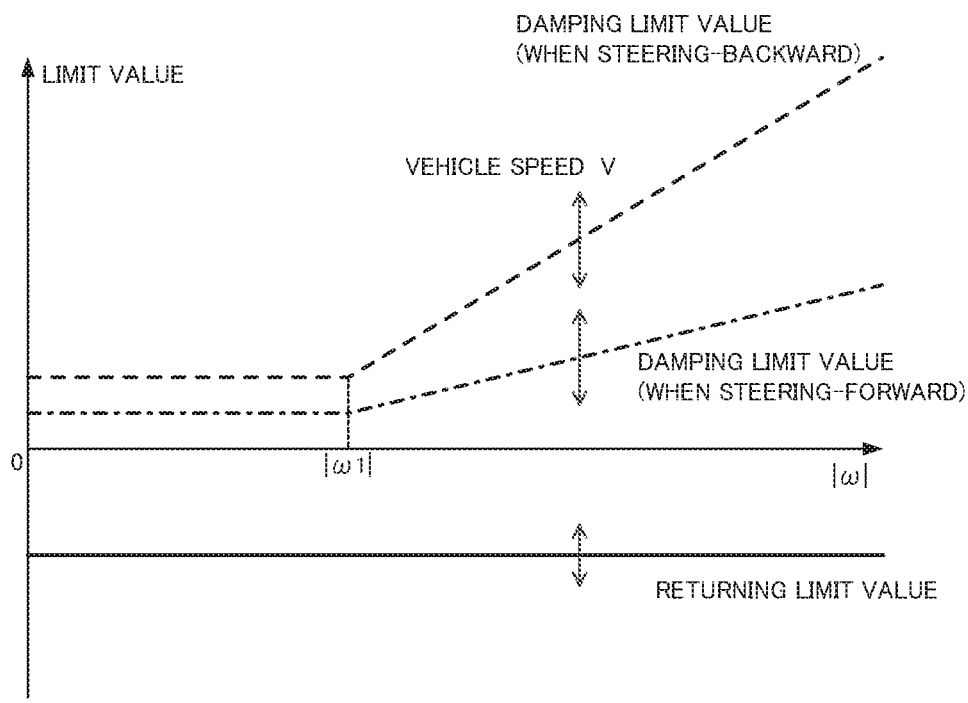
FIG. 14 is a characteristic diagram showing a setting example of a limit value that is changed by the vehicle speed.

As the limit value set by any vehicle speed, for example, as shown in FIG. 14, plural damping limit values and plural returning limit values in the steering-backward and the steering-forward maneuvers depending on the vehicle speed are prepared. In a case that the limit value corresponding to the inputted vehicle speed V is not existed, the nearest-neighbor limit value for the vehicle speed is used, the interpolated limit value from the prepared limit values is used or other methods are used.

Figure 15:
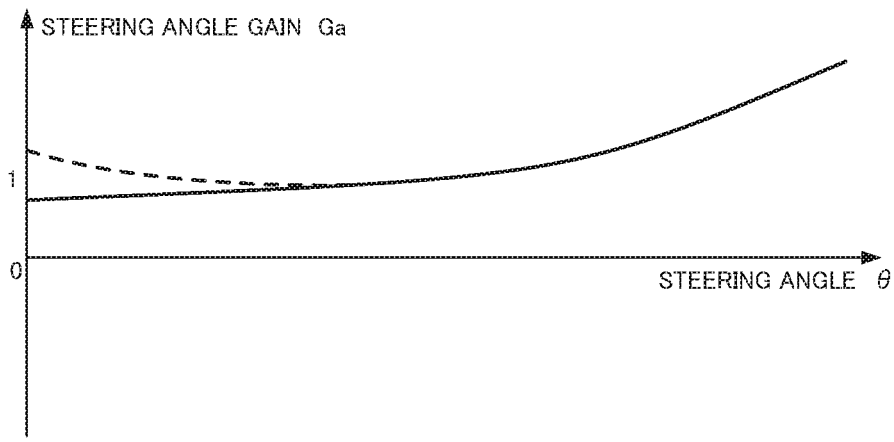
FIG. 15 is a characteristic diagram showing an output example of a steering angle gain section.

The steering angle gain section 243 determines the steering angle gain Ga depending on the steering angle θ. For example, the steering angle gain Ga has a characteristic shown in the solid line of FIG. 15. When the steering angle θ is larger, the steering angle gain Ga is also larger. The characteristic of the steering angle gain Ga is not limited to the above characteristic. For example, as shown in the broken line of FIG. 15, in a case that the steering angle θ is small, the steering angle gain Ga is smaller when the steering angle θ is larger, and in a case that the steering angle θ is large, the steering angle gain Ga is also larger when the steering angle θ is larger.

Figure 16:
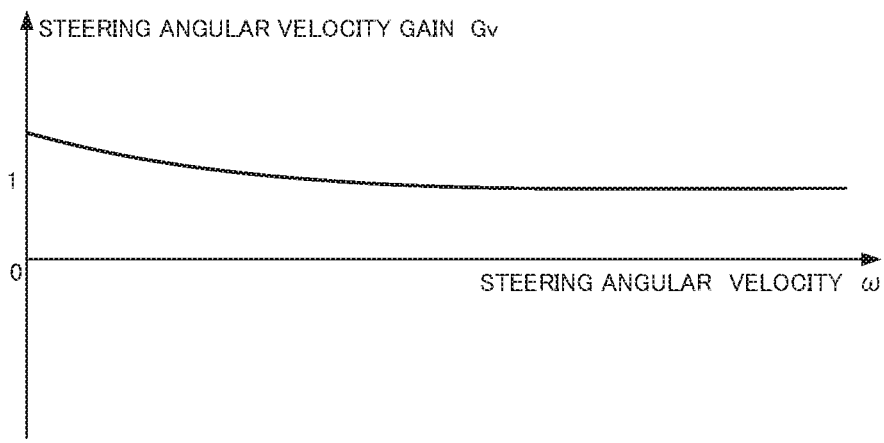
FIG. 16 is a characteristic diagram showing an output example of a steering angular velocity gain section.

The steering angular velocity gain section 244 determines the steering angular velocity gain Gv depending on the steering angular velocity ω. For example, the steering angular velocity gain Gv has a characteristic shown in FIG. 16. When the steering angular velocity ω is larger, the steering angular velocity gain Gv is smaller, and when the steering angular velocity ω is equal to or larger than a predetermined steering angular velocity, the steering angular velocity gain Gv is constant. The characteristic of the steering angular velocity gain Gv is not limited to the above characteristic.

The limiting section 242 limits the deviation Δω by using the limit value obtained by multiplying the set limit value depending on the vehicle speed V with the steering angle gain Ga and the steering angular velocity gain Gv.

Comparing with the operation of the first embodiment, the operation of the limiting process in the limiting section of the second embodiment is different from that of the first embodiment.

Figure 17:
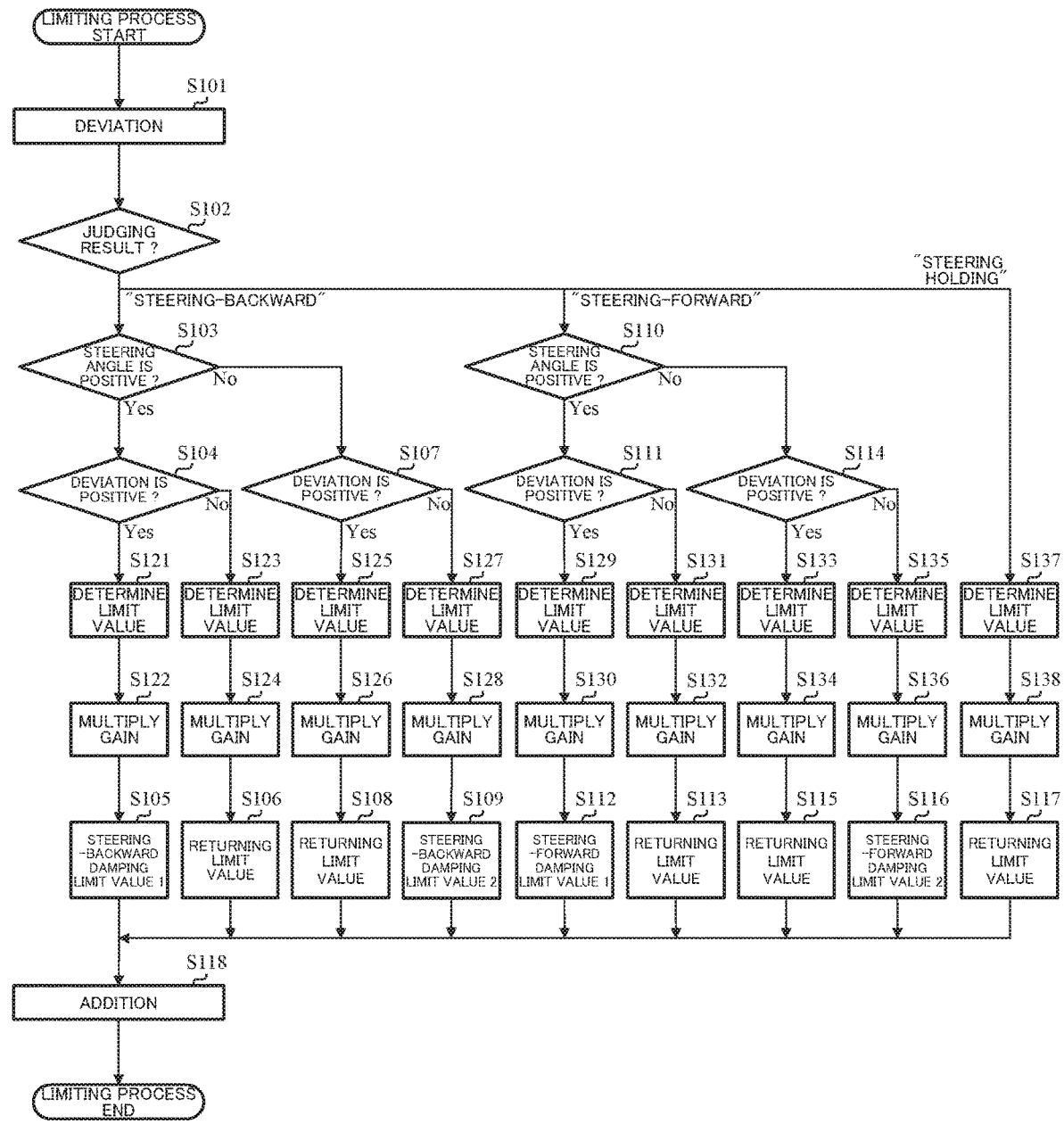
FIG. 17 is a flowchart showing an operation example of the limiting process (the second embodiment).

FIG. 17 shows the operation example of the limiting process in the second embodiment. Comparing with the limiting process in the first embodiment shown in FIG. 12, the operations of determining the limiting value in the operations that the deviation Δω is limited by using the limit value (Steps S105, S106, S108, S109, S112, S113, S115, S116 and S117) are changed (Steps S121, S123, S125, S127, S129, S131, S133, S135 and S137). The operations of the gain multiplication (Steps S122, S124, S126, S128, S130, S132, S134, S136 and S138) are performed between the determination of the limit value and the performing of the limit. In the determination of the limit value, the used limit value is determined in accordance with the inputted vehicle speed V. For example, in the Step S121, the steering-backward damping limit value 1 corresponding to the vehicle speed V is used as the limit value. In the gain multiplication, the limit value determined in the limit value determination is multiplied by the steering angle gain Ga depending on the steering angle θ and the steering angular velocity gain Gv depending on the steering angular velocity ω. The deviation Δω is limited by using the limit value obtained in the above operations.

The change of the limit value due to the vehicle speed may be performed by the multiplication of the gain, as well as the change of the limit value due to the steering angle and the steering angular velocity. In this case, the gain to the damping limit value may be the same as or may be different from the gain to the returning limit value. The change of the limit value due to the steering angle or the steering angular velocity may be performed by the method that the limit value is set by any steering angle or any steering angular velocity. The limit value may be changed by not the multiplication of the gain but the addition or subtraction of an offset. In the above explanation, the limit value is changed by using all of the vehicle speed, the steering angle and the steering angular velocity. The limit value may be changed by using at least one of the vehicle speed, the steering angle and the steering angular velocity.

In the above embodiments (the first embodiment and the second embodiment), the steering angular velocity can be obtained by multiplying a motor angular velocity with a gear ratio. The virtual characteristic may be changeable depending on the vehicle speed, the steering angle and the steering-forward state, the steering-backward state or the steering holding state. Further, a virtual friction characteristic may be added to the virtual vehicle model. In the above embodiments, the integral (I) control calculation is performed to the handle-returning control deviation. All of the proportional (P) control calculation, the integral (I) control calculation and the differential (D) control calculation can be performed to the handle-returning control deviation. At least one of the proportional (P) control calculation, the integral (I) control calculation and the differential (D) control calculation may be performed to the handle-returning control deviation.

EXPLANATION OF REFERENCE NUMERALS 1 handle (steering wheel)
2 column shaft (steering shaft, handle shaft)
10 torque sensor
12 vehicle speed sensor
14 steering angle sensor
20 motor
30 control unit (ECU)
31 current command value calculating section
33 current limiting section
34 compensation signal generating section
35 PI-control section
36 PWM-control section
37 inverter
40 CAN
100, 200 handle-returning control section
111 returning-steering angular velocity calculating section
112 inverting section
121 motor torque constant section
131 viscosity coefficient outputting section
132 viscosity characteristic section
133 virtual characteristic section
141 steering-forward/steering-backward judging section
142, 242 limiting section
145, 146 sign section
147 limit value determining section
148 limit executing section
151 steering torque gain section
152 vehicle speed gain section
161 integral control section
163 limiter
243 steering angle gain section
244 steering angular velocity gain section

The invention claimed is:

1. An electric power steering apparatus that calculates a current command value based on a steering torque and a vehicle speed, drives a motor based on said current command value and assist-controls a steering system by a driving-control of said motor, comprising:
a handle-returning control section that calculates a target steering angular velocity by using a steering angle, said vehicle speed, said steering torque and said current command value, limits said target steering angular velocity depending on a steering angular velocity, calculates a handle-returning control current by using a limit-target steering angular velocity which is obtained from a pre-limit deviation between said target steering angular velocity and said steering angular velocity, which is suppressed to a limit value or less, and drives said motor by a compensated current command value which is obtained by adding said handle-returning control current to said current command value.

2. The electric power steering apparatus according to claim 1,
wherein said handle-returning control section comprises:
a returning-steering angular velocity calculating section that calculates a returning-steering angular velocity by using said steering angle and said vehicle speed;
an integration torque calculating section that calculates an integration torque by using said steering torque and said current command value;
a steering-system characteristic section that calculates said target steering angular velocity based on a virtual vehicle model by using said returning-steering angular velocity and said integration torque;
a target steering angular velocity limiting section that limits said target steering angular velocity by setting said limit value to said pre-limit deviation depending on said steering angular velocity;
a handle-returning control deviation calculating section that calculates a handle-returning control deviation by multiplying a post-limit deviation between said limit-target steering angular velocity and said steering angular velocity with a vehicle speed gain and a steering torque gain; and
a handle-returning control current calculating section that performs at least one control calculation of a proportional control calculation, an integral control calculation and a differential control calculation for said handle-returning control deviation, and obtains said handle-returning control current by limiting an output with said vehicle speed gain and said steering torque gain.

3. The electric power steering apparatus according to claim 2,
wherein said target steering angular velocity limiting section sets said limit value so that a magnitude of said limit value in a case that said pre-limit deviation is a damping deviation which operates so as to converge a motion of a handle is larger than a magnitude of said limit value in a case that said pre-limit deviation is a returning deviation which operates so as to return a handle to a neutral position.

4. The electric power steering apparatus according to claim 3, wherein said target steering angular velocity limiting section further sets said limit value so that a magnitude of said limit value in a case that said pre-limit deviation is said damping deviation when steering-forward is smaller than a magnitude of said limit value when steering-backward.

5. The electric power steering apparatus according to claim 3, wherein said target steering angular velocity limiting section sets said limit value so that a magnitude of said limit value in a case that said pre-limit deviation is said damping deviation becomes larger when said steering angular velocity is higher.

6. The electric power steering apparatus according to claim 4, wherein said target steering angular velocity limiting section sets said limit value so that a magnitude of said limit value in a case that said pre-limit deviation is said damping deviation becomes larger when said steering angular velocity is higher.

7. The electric power steering apparatus according to claim 3,
wherein, in a steering-backward state, said pre-limit deviation whose value is negative when said steering angle is positive or whose value is positive when said steering angle is negative, is set to said returning deviation, and
in a state that said steering angular velocity is high, said pre-limit deviation whose value is positive when said steering angle is positive or whose value is negative when said steering angle is negative, is set to said damping deviation.

8. The electric power steering apparatus according to claim 4,
wherein, in a steering-backward state, said pre-limit deviation whose value is negative when said steering angle is positive or whose value is positive when said steering angle is negative, is set to said returning deviation, and
in a state that said steering angular velocity is high, said pre-limit deviation whose value is positive when said steering angle is positive or whose value is negative when said steering angle is negative, is set to said damping deviation.

9. The electric power steering apparatus according to claim 5,
wherein, in a steering-backward state, said pre-limit deviation whose value is negative when said steering angle is positive or whose value is positive when said steering angle is negative, is set to said returning deviation, and
in a state that said steering angular velocity is high, said pre-limit deviation whose value is positive when said steering angle is positive or whose value is negative when said steering angle is negative, is set to said damping deviation.

10. The electric power steering apparatus according to claim 2, wherein said limit value is changed in accordance with said vehicle speed.

11. The electric power steering apparatus according to claim 2, wherein said limit value is changed in accordance with said steering angle.

12. The electric power steering apparatus according to claim 2, wherein said limit value is changed in accordance with said steering angular velocity.

* * * * *